(12) United States Patent
Hellgren

(10) Patent No.: US 10,155,453 B2
(45) Date of Patent: Dec. 18, 2018

(54) METHOD TO CONTROL A VEHICLE WITH A LONG TERM AND A SHORT TERM CONTROL, COMPUTER PROGRAM AND READABLE MEDIUM AND CONTROL UNIT PERFORMING THE STEPS THEREOF

(71) Applicant: VOLVO TRUCK CORPORATION, Göteborg (SE)

(72) Inventor: Jonas Hellgren, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 123 days.

(21) Appl. No.: 15/112,851

(22) PCT Filed: Jan. 22, 2014

(86) PCT No.: PCT/EP2014/000156
§ 371 (c)(1),
(2) Date: Jul. 20, 2016

(87) PCT Pub. No.: WO2015/110129
PCT Pub. Date: Jul. 30, 2015

(65) Prior Publication Data
US 2016/0339799 A1 Nov. 24, 2016

(51) Int. Cl.
*G05D 3/00* (2006.01)
*G06F 7/00* (2006.01)
(Continued)

(52) U.S. Cl.
CPC ....... *B60L 15/2045* (2013.01); *B60L 11/1862* (2013.01); *B60W 10/06* (2013.01); *B60W 10/08* (2013.01); *B60W 10/10* (2013.01); *B60W 10/11* (2013.01); *B60W 10/26* (2013.01); *B60W 10/30* (2013.01); *B60W 20/12* (2016.01);
(Continued)

(58) Field of Classification Search
None
See application file for complete search history.

(56) References Cited

U.S. PATENT DOCUMENTS

2011/0066308 A1  3/2011  Yang et al.

FOREIGN PATENT DOCUMENTS

DE  102006033930 A1  1/2008
DE  102011118543 A1  5/2012
(Continued)

OTHER PUBLICATIONS

International Search Report (dated Nov. 13, 2014) for corresponding International App. PCT/EP2014/000156.

*Primary Examiner* — Anne M Antonucci
*Assistant Examiner* — Kenny A. Taveras
(74) *Attorney, Agent, or Firm* — WRB-IP LLP

(57) ABSTRACT

A method is provided to control a vehicle, wherein the vehicle at least includes a drivetrain, at least a first energy buffer and at least one auxiliary system, wherein the vehicle is controlled with a long term control and a short term control, whereby the long term control defines a signal trajectory of at least one buffer parameter for a predefined time horizon, whereby the long term control accesses a momentary vehicle position and an upcoming travel route for the predefined time horizon and defines the signal trajectory depending on at least the vehicle position and the upcoming travel route, and whereby the short term control controls the vehicle such that the at least one predefined buffer parameter follows the defined signal trajectory.

8 Claims, 4 Drawing Sheets

(51) Int. Cl.
    *G06F 17/00*     (2006.01)
    *B60L 15/20*     (2006.01)
    *B60W 10/08*     (2006.01)
    *B60W 10/11*     (2012.01)
    *B60W 10/26*     (2006.01)
    *B60W 10/30*     (2006.01)
    *B60W 20/12*     (2016.01)
    *B60W 10/06*     (2006.01)
    *B60W 10/10*     (2012.01)
    *B60L 11/18*     (2006.01)

(52) U.S. Cl.
    CPC ..... *B60L 2200/36* (2013.01); *B60L 2240/622* (2013.01); *B60L 2260/52* (2013.01); *B60L 2260/54* (2013.01); *B60W 2510/244* (2013.01); *B60W 2510/246* (2013.01); *B60W 2510/305* (2013.01); *B60W 2550/402* (2013.01); *B60W 2710/0666* (2013.01); *B60W 2710/083* (2013.01); *B60W 2710/10* (2013.01); *B60W 2710/244* (2013.01); *B60W 2710/30* (2013.01); *B60Y 2200/92* (2013.01); *Y02T 10/6291* (2013.01); *Y02T 10/645* (2013.01); *Y02T 10/7005* (2013.01); *Y02T 10/705* (2013.01); *Y02T 10/7044* (2013.01); *Y02T 10/72* (2013.01); *Y02T 10/7283* (2013.01); *Y02T 10/7291* (2013.01); *Y02T 10/84* (2013.01); *Y02T 90/16* (2013.01); *Y02T 90/161* (2013.01); *Y02T 90/162* (2013.01)

(56) References Cited

FOREIGN PATENT DOCUMENTS

| | | |
|---|---|---|
| DE | 102012001174 A1 | 7/2013 |
| EP | 2620343 A2 | 7/2013 |
| FR | 2991277 A3 | 12/2013 |

METHOD TO CONTROL A VEHICLE WITH A LONG TERM AND A SHORT TERM CONTROL, COMPUTER PROGRAM AND READABLE MEDIUM AND CONTROL UNIT PERFORMING THE STEPS THEREOF

BACKGROUND AND SUMMARY

The invention relates to the field of vehicle control and especially to the field of predictive vehicle control of a utility vehicle.

The rise in fossil fuel price and decrease of battery prices make electrified vehicles, such as hybrid and electric vehicles increasingly attractive. For a vehicle manufacturer it is important to offer a portfolio of powertrains used in these electrified vehicles. The powertrain design must match to customer requirements. For example the battery size of a small vehicle used in a transport network with concentrated charge pole placement can be designed smaller than the battery of a large vehicle used in a transport network with scatter charge pole placement. The consequence is a huge number of variants in the powertrain portfolio of the electrified vehicles.

Additionally, component properties, for example battery energy density, can change when a component is replaced. The consequence of all this is that a flexible and generic energy management strategy becomes very critical. There will simply not be possible to develop specific energy management algorithms for all possible variants in the powertrain portfolio of the electrified vehicles.

For vehicle customers, ownership cost is normally the important measure. This is especially valid for owners of heavy vehicles.

It is desirable to provide a method to control a vehicle and especially a utility vehicle, in order to minimise the ownership cost for an owner of the vehicle and especially a utility vehicle such as a truck.

The inventive method is applied upon a vehicle, which comprises a drivetrain, at least a first energy buffer and at least one auxiliary system. The invention uses the idea of a complete energy management and the use of at least an energy buffer within the vehicle in order to drive a vehicle from a first position to a second position in the most cost efficient way.

The result of the method is that a minimization of the ownership cost for a specific transport task of the vehicle and in the end for the whole lifetime of the vehicle can be performed. This is achieved through finding a balance between fuel consumption, grid electricity consumption (where applicable) and components wear and thereby minimise the total cost for propelling the vehicle. Grid electricity consumption is relevant for plug-in and full electric vehicles. The method recognises the cost for component wear, especially battery degradation, and take this into account when optimising the control of the vehicle. In the context of this invention, the ownership cost is the cost for propelling the vehicle from one position to another and at least including the energy needed for propulsion and wear on at least one critical component.

The inventive method is applicable on vehicle provided with at least a first energy buffer. An energy buffer can be any component that can store energy in any form, e.g. a pressure tank, an air conditioning system, any other thermal system of a vehicle, a flywheel and/or an electric battery.

To control the energy flows in the vehicle, the inventive method suggest that the vehicle is provided with a long term control and a short term control. The long term control is a process for setting a signal trajectory of at least one buffer parameter in the vehicle, during a predefined time horizon, i.e. how the at least one buffer parameter should vary over time during the predefine time horizon. The short term control thereafter controls the vehicle such that said signal trajectory is followed.

In order to achieve the long term control, the long term control;
  accessing a momentary vehicle position and an upcoming travel route for the predefined time horizon, and
  defining the at least one signal trajectory depending on at least the vehicle position and the upcoming travel route.

In order to control the vehicle the short term control;
  controlling the vehicle (v) such that the at least one buffer parameter follows said defined signal trajectory.

Due to a complete vehicle approach considering both the vehicle powertrain and the vehicle auxiliary systems the planning of the use of the energy resources can be optimised. In the long term control at least one signal trajectory is set for at least one key vehicle parameter and in the short term control the vehicle is controlled such that the set signal trajectory is followed. The long term control becomes input about the environment in the form of position information and upcoming travel route information and also information about vehicle values. These are processed to an environment interpretation used for calculate the at least one signal trajectory. A complete vehicle value for a transport mission over said predefined horizon can be carried out in the most value efficient manner possible. That is, optimal in relation to both energy consumption and component wear.

The vehicle receives information about a vehicle position and an upcoming travel route for a predetermined time horizon. The information about the upcoming travel route at least comprises data about the topology of the travel route and optionally presence of a charging station along the upcoming travel route. A probable travel speed for the upcoming travel route can be calculated for the upcoming travel route.

A signal trajectory is a strategic control signal for a vehicle parameter. A typical signal trajectory is the state of charge of a battery, which varies over time, another typical signal trajectory is an on/off control of an engine.

In an aspect of the invention the long term control accessing information about the presence of a charging station and/or gas station at a predicted vehicle stop is included in the information given about the upcoming vehicle route. It is further provided that the long term control in addition or as alternative accessing, information about a distance to at least the next charging station and/or gas station along the upcoming travel route. By adding information to the long term control about where the vehicle can fill up/charge energy, the use of the energy already provided within the vehicle can be further optimised, in that a signal trajectory for the energy buffers can be set such that the battery is in need of a charge when arriving at a stop with a charging, station. Further a choice can be made between the use of stored energy, e.g. electrical energy, and fuel, e.g. using the combustion engine, in order to optimise the cost for driving the vehicle.

In an aspect of the invention the long term control is setting the signal trajectory at least further dependent on a battery cell temperature, an engine maximum power, a buffer maximum power and a buffer depth of discharge. By adding constraints to within which threshold values a predetermined number of parameters within the vehicle is allowed to vary, the setting of the at least one signal trajectory can be made more specific and the optimisation becomes more effective. Further, overload and high wear of components can be avoided. An example of a state that benefits from a constraint is the buffer state of charge. By setting lower and upper limitations, degradation of the energy buffer can be decreased.

The signal trajectory set is primarily an energy buffer signal trajectory, such as a state of charge. However, further signal trajectories can be set and be any one of an engine on-off control, an air condition power and an air compressor power. Further by providing a plurality of signal trajectories to be followed a more accurate cost optimisation can be achieved.

In one preferred aspect of the invention the long term control uses a complete vehicle cost optimisation in order to calculate the at least one signal trajectory. In this aspect the complete vehicle cost of a vehicle is at least dependent on a fuel consumption parameter and a buffer energy consumption parameter. Thereby can an optimal use of the energy provided in energy buffers be used in relation to the mostly more expensive energy from a combustion engine.

In a further preferred aspect, the complete vehicle cost optimisation is further dependent on at least one buffer wear parameter. A value is set on the buffer wear, whereby a cost for a predicted buffer wear for a specific signal trajectory can be calculated. The cost for the buffer wear can thereby be optimised together with the fuel consumption and the complete cost for taking the vehicle from A to B can be optimised. It is further preferred that the vehicle cost optimisation further is dependent on an energy consumption parameter, i.e. total energy consumption. Further component wear parameters can be integrated in the long term control such as mechanical brakes and other component subjected to wear. By including the wear of an energy buffer it can be controlled such that the wear of the buffer is minimised. For example when an upcoming travel route comprises a small downhill slope, no extra discharge of an electric battery, before reaching the downhill slope, is planned by the set signal trajectory, because the regeneration of energy during the small downhill is small. The regenerated energy can be used in other auxiliary systems which are not subjected to wear, such as an air conditioning system that can be driven by the regenerated energy.

The short term control controls the drivetrain and the auxiliary systems of the vehicle such that a cost for energy consumption of said vehicle is minimised, whereby said cost at least is dependent on the sum of energy losses (Ploss) in said vehicle, energy needed for the drivetrain and energy needed for auxiliary systems.

The short term control controls the drivetrain and said auxiliary systems such that a cost for energy consumption of said vehicle is minimised, wherein the cost at least is dependent on the energy losses in the vehicle, energy needed for the drivetrain and energy needed for auxiliary systems and thereby said signal trajectories are followed. The signal trajectories are set by the long, term control, in order to minimise the values decrease of the vehicle during a transport over the predefined time horizon. When the short term control controls the vehicle it optimises the use of energy in the vehicle in such a way that the set signal trajectories are followed.

The short term control controls at least one of an electric motor torque, a selection of gear speed, engine torque and air condition. The short term control preferably controls all aspects of the driveline and the auxiliary systems dependent on the signal trajectories set by the long term control.

The inventive method is preferably coded into a computer program comprising program code means for performing the steps of chosen aspects of the method when said program is run on a computer.

It is preferred that a computer readable medium carrying a computer program comprising program code means for performing the steps of the inventive method when said program product is run on a computer.

The method is preferably used in a utility vehicle. A utility vehicle will have the most benefit of the method due to its large mass. The invention therefore comprises a control unit for controlling a utility vehicle and the control unit being configured to perform chosen steps of the inventive method.

BRIEF DESCRIPTION OF THE DRAWINGS

The present invention will now be described in detail with reference to the figures; wherein.

DETAILED DESCRIPTION

In the following only one embodiment of the invention is shown and described, simply by way of illustration of one mode of carrying out the invention. The invention is not limited to the specific flowchart presented, but includes all variations within the scope of the present claims.

Figure 1:
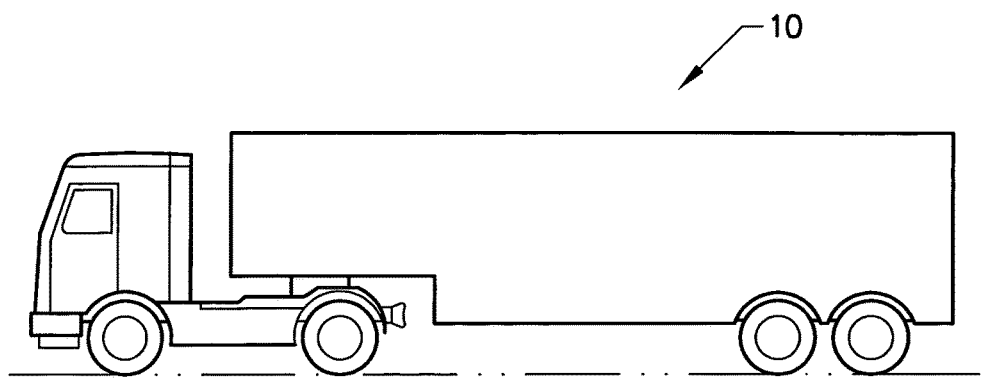
FIG. 1 shows a utility vehicle and a driveline of a utility vehicle suitable to control with the inventive method.

Now, FIG. 1 discloses a vehicle 10 in the form of a truck. The invention can be applied on smaller vehicles such as passenger cars, but the total cost saving effect of the inventive method is much more significant if the invention is implemented in heavier vehicles such as trucks and busses, and especially heavy vehicle provided with a hybrid driveline.

Figure 2:
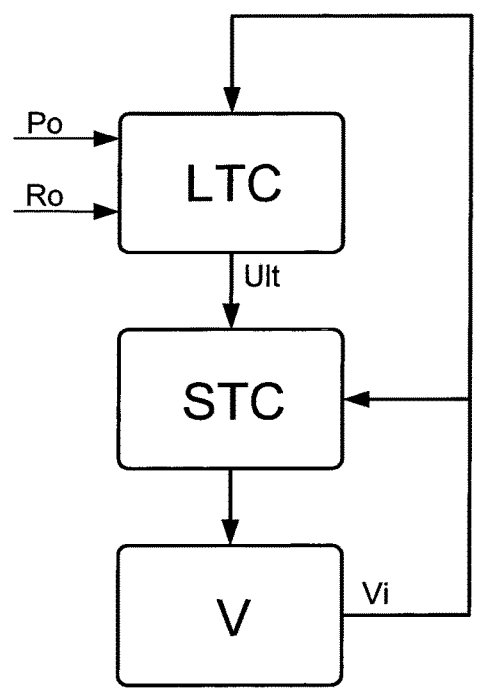
FIG. 2 shows a flow-chart over the inventive method.

In FIG. 2 a basic flow-chart of the inventive method is disclosed. The method is continuously performed and starts in the block LTC, symbolising the long term control. The long term control LTC sets out a signal trajectory lilt for at least one vehicle parameter $SoC\_b$, $SoC\_ac$, which commonly is a parameter $SoC\_b$, $SoC\_ac$ of the at least one buffer of the vehicle 10. The short term control STC controls the vehicle such that the trajectories Ult from the long term control LTC are followed.

The buffer is any energy buffer in the vehicle 10; it could be e.g. an electric battery, a cooling/heating system, a pressure tank or a flywheel. In FIG. 3-5 and the related description $SoC\_b$, $SoC\_ac$ discloses the signal trajectories for a state of charge $SoC\_b$, $SoC\_ac$ of an electrical battery and an air conditioning system of a vehicle 10.

Signal trajectories Ult can optionally be set for a plurality of vehicle parameters, such as engine on-off control and air conditioning, power and an air compressor.

In order to set the signal trajectories tilt for the vehicle parameters $SoC\_b$, $SoC\_ac$, the long term control LTC is accessing information about the position Po of the vehicle 10 and an upcoming travel route Ro of the vehicle, for a predefined time horizon t. Further, the long term control LTC is provided with vehicle dependent parameters Vi, such as a momentary state of charge $SoC\_b$, $SoC\_ac$ of the at least one energy buffer, current vehicle speed, or state of any other vehicle parameter. The vehicle dependent parameters Vi is also fed into the short term control STC. The method aims to minimise a decrease in vehicle Value V, wherein the value of the energy stored in the vehicle and the value of the components in the vehicle can be comprised in the vehicle value V. The vehicle value V is further explained in conjunction with FIG. 3e.

The long term control LTC is optimised to minimise the ownership cost of the vehicle, wherein with the ownership cost OC is meant the cost for propelling the vehicle as well as the cost for wear of the vehicle and the cost of external energy. The ownership cost OC can be expressed as:

$$OC(Ult) = \Delta V + cost\_ext = V(t=t0) - V(t=t0+tH) + cost\_ex,$$

in which;

$$V(t) = m\_f(t) \times p\_f(t) + SoC\_b(t) \times E\_b \times p\_b +$$
$$+ SoC\_ac(t) \times E\_ac \times p\_ac + SoH\_b \cdot P\_b$$

As can be seen in the equations. $\Delta V$ comprises the cost for the wear of the battery in that the state of health SoH_b of the battery is included. The state of health SoH_b of the battery is preferably a value between 0 and 1, wherein, when the SoH_b is 0 the battery must be exchanged and when the SoH_b is 1 the battery is new. The value of the SoH of the battery is multiplied with the value of a new battery to become the residual value of the battery. The value V(t) of the vehicle further comprises the value of the fuel in the vehicle, i.e. the amount of fuel m_f(t) multiplied with the value of the fuel p_f(t). And the value of the energy in the battery, i.e. the state of charge SoC_b multiplied with the capacity of the battery E_b and the energy price p_b of the energy in the battery. Hence, the evaluation including all the energy consumption, i.e. value of fuel consumed and energy used from a buffer such as a battery, and wear of parts, such as component wear, i.e. battery wear when charged and discharged. Further components can be added to the value equation V(t) without departing, from the scope of the invention. Further, some energy buffers such as an air conditioning system can be classified as not subjected to wear, whereby a use of such an energy buffer becomes more profitable.

The signal trajectories Ult expresses how the vehicle parameters SoH_b, SoH_ac varies over a finite time horizon tH, A suitable length of the time horizon tH is about 10 to 30 minutes. The signal trajectories Ult are sent from the long term control LTC to the short term control STC, which possesses the direct control over the vehicle 10.

The short term control SIC controls e.g. electric machine torque, gear selection, engine torque and AC power. An example of realisation of the short term control SIC is to use a minimisation function according to:

$$c(Vi) = Plosses + \alpha \times Pess + \beta \times Pac$$

In which c is supposed to be minimised and Vi is the vehicle dependent parameters. Plosses is the power losses in the vehicle. Pess is the power available in the energy buffer. Pac is the power of an air conditioning. The parameters a and β are functions enabling tracking of the battery state of charge and the air conditioning power variables. Hence, a and β are the set signal trajectories Ult for the energy buffer and the air conditioning set by the long term control LTC. This is an example of how the short term control STC can be implemented and the invention is not limited thereto, a and β are functions of the state of charge SoC_b, SoC_ac of their respective energy buffers. The minimisation function can be reduced such that just the trajectory a for the battery state of charge SoC_b is used, whereby the term β×Pac in the equation is deleted, or the minimisation function can be expanded to include more variables, whereby additional terms are added in the equations.

In FIG. 3a-e, 4a-e and 5a-e implementation examples of the inventive method, in the vehicle 10 in FIG. 1, is disclosed. The vehicle 10 can be a plug-in hybrid vehicle and it is assumed that the price of electric energy is much lower compared to fossil fuel. The vehicle 10 is provided with two energy buffers, one electric battery and one air conditioning, in which the state of charge correlates to the temperature of a passenger compartment.

Figure 3A:
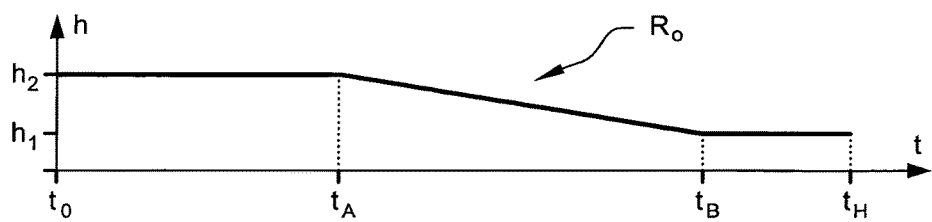
FIG. 3 shows an example of an implementation of the inventive method.
Figure 3B:
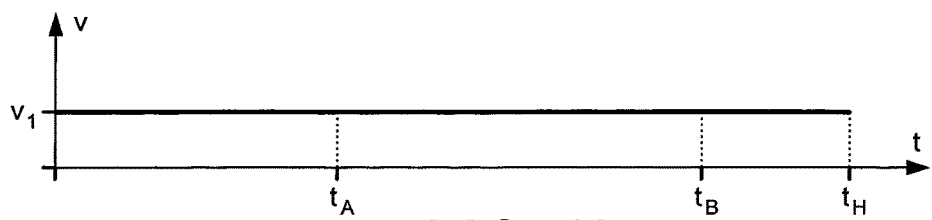

FIG. 3a discloses an upcoming travel route Ro for a vehicle 10. The upcoming travel route Ro is foreseen for a predetermined time horizon tH. In all the FIGS. 3a-e the time t is represented on the x-axis. In FIG. 3a, the y-axis represents the height (preferably over sea level) of the travel route Ro. As can be seen, the vehicle 10 will travel at level ground at an elevation of h2 between the time tO and tA and thereafter relative steep decent to the elevation of h1 between the time tA and tB and thereafter is another level distance until the time tH. In the diagram in FIG. 3b a set vehicle speed v1, of the vehicle 10 is shown and which speed v is set to be v1 over the whole upcoming travel Route Ro, i.e. whole time between the time tO and tH. It is the information given, as input Po, Ro to the long term control LTC that comprises the information about the position Po of the vehicle and upcoming travel route Ro. The information about the upcoming travel route Ro thereby comprises topology information.

Figure 3C:
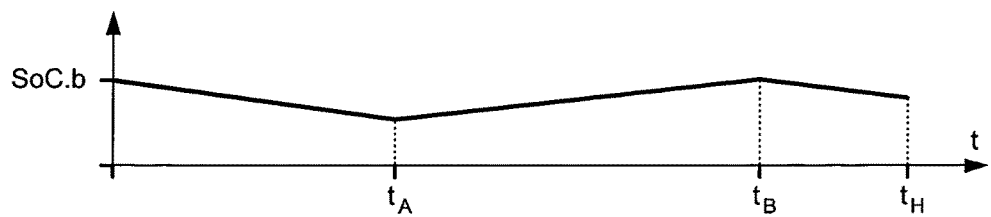
Figure 3D:
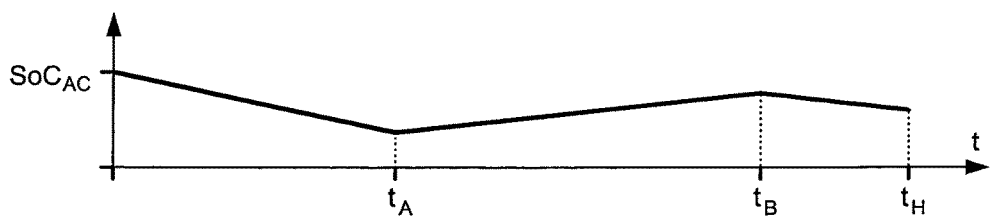
Figure 3E:
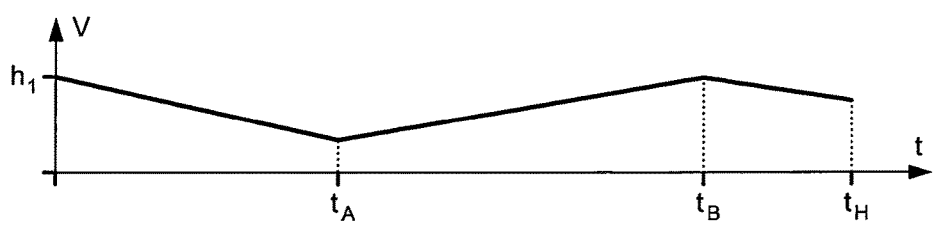
Figure 4A:
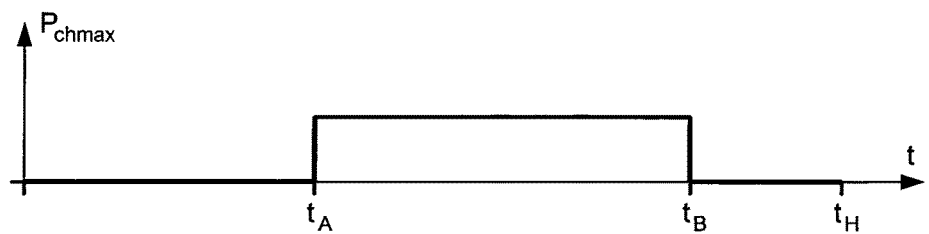
FIG. 4 shows an example of an implementation of the inventive method.
Figure 4B:
Figure 4C:
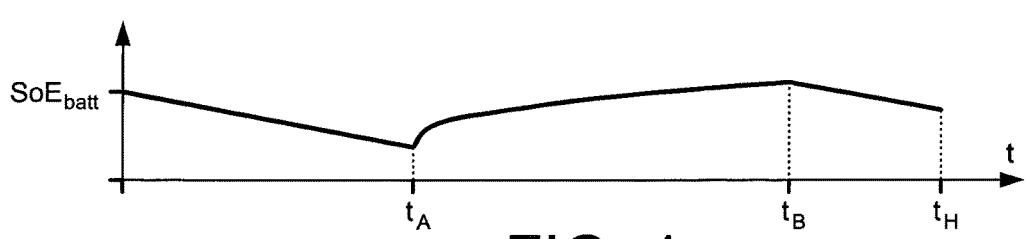
Figure 4D:
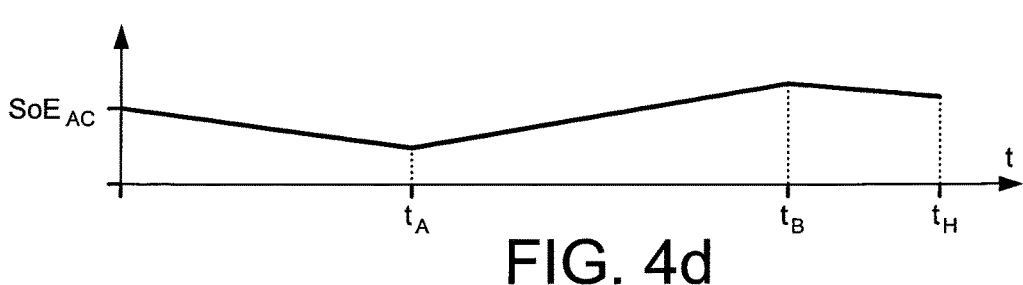
Figure 4E:

Now, in the FIGS. 3c, 3d the signal trajectories tilt defined by the long term control LTC are disclosed. In the diagram disclosed in FIG. 3c, the signal trajectory of a state of charge SoC_b of a first energy buffer (battery) is disclosed. In FIG. 3d, the signal trajectory of a state of charge SoC_AC of a second energy buffer (air conditioning, i.e. inner temperature in the passenger compartment of vehicle 10). In FIG. 3e the variation in vehicle value V is disclosed.

Because, the long term control LTC is provided with the information that there is downhill slope between the time tA and tB, the long term control LTC has set the signal trajectories of the energy buffers such that they are decreasing during the travel over the level ground during the time tO-tA, in order to use the energy as effective as possible. When the vehicle 10 travels over level ground during the time tO-tA, the signal trajectories for the energy buffers are set to decrease, such that they can be recharged during the downhill travel between tA and tB, where regeneration of potential energy is possible. This changes fuel due to lower engine power output. The signal trajectory of the respective energy buffer follows the same pattern.

In FIG. 3e the complete value V of the vehicle is disclosed. The complete value of the vehicle at least comprises the energy stored in the vehicle and the value of components subjected to wear, in this case battery wear. The signal trajectories in FIGS. 3c and 3d are set to keep the value V of the vehicle as high as possible. As can be seen in FIG. 3e, the complete value V of the vehicle 10 is increasing between tA and tB, due to the regeneration of potential energy and minimal/zero fuel consumption.

Now in FIG. 4a-e another upcoming travel rote Ro is disclosed. The long term control LTC has been provided with the information of the position Po of the vehicle and the upcoming travel route Ro and determined that at a vehicle stop between the time tA and tB a charging pole is present, which can deliver the maximum charging power Pchmax. To maximise the vehicle value V (FIG. 4e) the long term control determines that as much energy as possible should be absorbed to the energy buffers from the charging pole during the vehicle stop between tA and tB. The diagrams in FIG. 4c-e disclose the same parameters as corresponding diagrams in FIG. 3c-e. By setting the signal trajectories such that the battery is discharged before reaching the charging pole at the time tA, a maximal effect of the charging between the times tA and tB can be achieved, and the fuel consumption is lowered during the travel between tO and tA since more electricity is used instead. Further, during the charging the air conditioning power is maximised in order to use the cheap charging pole energy and build up a cooling buffer in the passenger compartment of the vehicle 10. Before the time tA, the vehicle value V decreases because of consumed fuel and lowered battery state of charge SoC. Between tA and tB, the vehicle value V increases, due to the increasing state of charge SoC of the battery and the air conditioning buffer.

As can be seen from both the examples in FIGS. 3 and 4, by setting the signal trajectories of at least the energy buffers, the vehicle value V can be optimised.

Figure 5A:
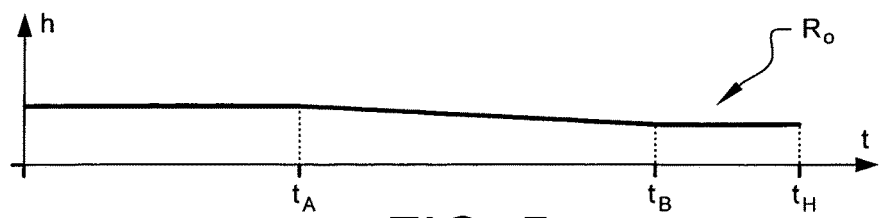
FIG. 5 shows an example of an implementation of the inventive method.
Figure 5B:
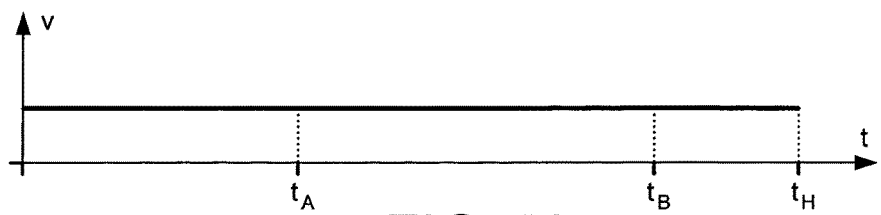
Figure 5C:
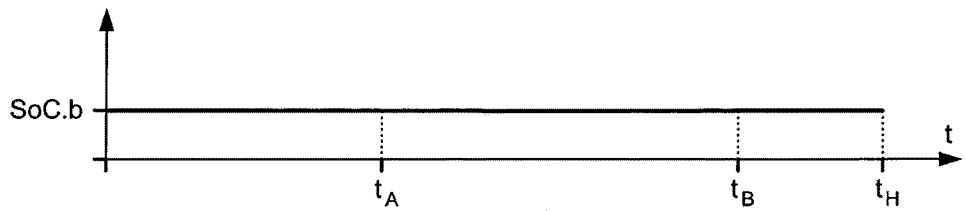
Figure 5D:
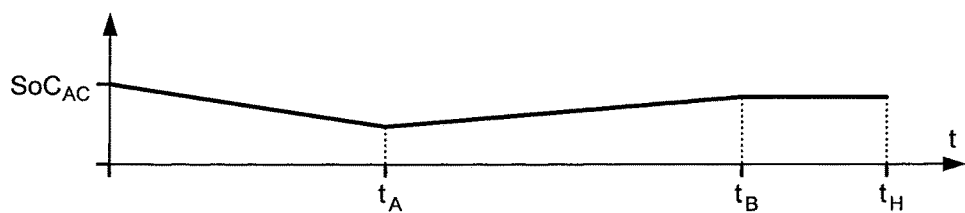
Figure 5E:
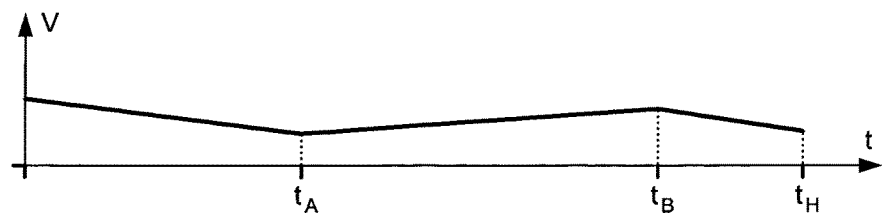

Now a further example upcoming travel route Ro is disclosed in FIG. 5a. FIG. 5b discloses that a set speed for the upcoming travel route Ro in FIG. 5a is constant v. The effect of the signal trajectories is disclosed in FIGS. 5c and d, wherein the vehicle value V is disclosed in the diagram in FIG. 5e. The information about the upcoming travel route Ro shown in figure 5a discloses that a light downhill slope is present between the times tA and tB. The long term control LTC is setting the signal trajectories as disclosed in the diagrams of FIGS. 5e and 5d. Here it can be seen that the signal trajectory of the state of charge Soc_b of the battery is such that the state of charge SoC_b of the battery is constant, wherein the state of charge SoC_ac of the air conditioning is set to vary. This effect is achieved when a wear cost of the battery is included in the optimisation function V(t) of the vehicle. However, the compressor of the air conditioning is not provided with a wear cost, whereby switching the compressor on/off does no increase the cost. It is thereby effective for the energy buffer of the air conditioning to use the low regeneration of energy in the light downhill slope instead of the battery.

As will be realised, the invention is capable of modification in various obvious respects, all without departing from the scope of the appended claims. Accordingly, the drawings and the description thereto are to be regarded as illustrative in nature, and not restrictive. Further, reference signs mentioned in the claims should not be seen as limiting the extent of the matter limiting protected by the claims, and their sole function is to make claims easier to understand.

The invention claimed is:

1. A method for controlling a vehicle, wherein the vehicle comprises a plurality of components including at least a drivetrain, at least a first energy buffer and at least one auxiliary system, wherein the vehicle is controlled based on a combination of a long term control process and a short term control process, comprising
performing the long term control process, including:
setting a signal trajectory of at least one control parameter for at least the first buffer for a predefined time horizon,
accessing a momentary vehicle position and an upcoming travel route for the predefined time horizon, the upcoming travel route comprising at least data about the topography of the travel route, and
defining the signal trajectory depending on at least the vehicle position and the upcoming travel route, and
performing the short term control process, including:
controlling operation of the vehicle such that the at least one control parameter for at least the first buffer follows the defined signal trajectory,
wherein the long term control process further accesses information about the presence of a charging station at a predicted vehicle stop and/or a distance to the next charging station, and
wherein the short term control process at least controls at least one of electric motor torque, selection of gear speed, engine torque and air condition,
wherein a vehicle value is defined as a combination of a value of energy stored in the vehicle and a value for wear of the components comprised with the vehicle, and control of the vehicle based on the combination of the long term control process and the short term control process reduces a decrease in the vehicle value at the end of the predefined time horizon.

2. Method according to claim 1, wherein the signal trajectory is at least further dependent on a battery cell temperature, an engine maximum power, a buffer maximum power and a buffer depth of discharge.

3. Method according to claim 1, wherein the signal trajectory is relating to at least one of a buffer state of charge, an engine on-off control, an air condition power and an air compressor power.

4. Method according to claim 1, wherein long term control process uses an ownership cost optimisation of the vehicle in order to calculate the signal trajectory, whereby the ownership cost at least is dependent on:
a fuel consumption parameter, and
a buffer energy consumption parameter.

5. Method according to claim 4, wherein the ownership cost optimisation further is dependent on:
at least one buffer wear parameter.

6. A computer comprising a program for performing, when the program is run on the computer, a method for controlling a vehicle, wherein the vehicle comprises a plurality of components including at least a drivetrain, at least a first energy buffer and at least one auxiliary system, wherein the vehicle is controlled based on a combination of a long term control process and a short term control process, the method comprising
performing the long term control process, including:
setting a signal trajectory of at least one control parameter for at least the first buffer for a predefined time horizon,
accessing a momentary vehicle position and an upcoming travel route for the predefined time horizon, the upcoming travel route comprising at least data about the topography of the travel route, and
defining the signal trajectory depending on at least the vehicle position and the upcoming travel route, and
performing the short term control process, including:
controlling operation of the vehicle such that the at least one control parameter for at least the first buffer follows the defined signal trajectory,
wherein the long term control process further accesses information about the presence of a charging station at a predicted vehicle stop and/or a distance to the next charging station, and
wherein the short term control process at least controls at least one of electric motor torque, selection of near speed, engine torque and air condition, wherein a vehicle value is defined as a combination of a value of energy stored in the vehicle and a value for wear of the components comprised with the vehicle, and control of the vehicle based on the combination of the long term control process and the short term control process reduces a decrease in the vehicle value at the end of the predefined time horizon.

7. A non-transitory computer readable medium carrying a computer program for performing, when the program product is run on a computer, a method for controlling a vehicle, wherein the vehicle comprises a plurality of components including at least a drivetrain, at least a first energy buffer and at least one auxiliary system, wherein the vehicle is controlled based on a combination of a long term control process and a short term control process, the method comprising performing the long term control process, including:
setting a signal trajectory of at least one control parameter for at least the first buffer for a predefined time horizon,
accessing a momentary vehicle position and an upcoming travel route for the predefined time horizon, the upcoming travel route comprising at least data about the topography of the travel route, and
defining the signal trajectory depending on at least the vehicle position and the upcoming travel route, and
performing the short term control process, including:
controlling operation of the vehicle such that the at least one control parameter for at least the first buffer follows the defined signal trajectory,
wherein the long term control process further accesses information about the presence of a charging station at a predicted vehicle stop and/or a distance to the next charging station, and
wherein the short term control process at least controls at least one of electric motor torque, selection of gear speed, engine torque and air condition,
wherein a vehicle value is defined as a combination of a value of energy stored in the vehicle and a value for wear of the components comprised with the vehicle, and control of the vehicle based on the combination of the long term control process and the short term control process reduces a decrease in the vehicle value at the end of the predefined time horizon.

8. A control unit for controlling a utility vehicle, the control unit being configured to perform, a method for controlling the vehicle, wherein the vehicle comprises a plurality of components including at least a drivetrain, at least a first energy buffer and at least one auxiliary system, wherein the vehicle is controlled based on a combination of a long term control process and a short term control process, the method comprising performing the long term control process, including:
setting a signal trajectory of at least one control parameter for at least the first buffer for a predefined time horizon,
accessing a momentary vehicle position and an upcoming travel route for the predefined time horizon, the upcoming travel route comprising at least data about the topography of the travel route, and
defining the signal trajectory depending on at least the vehicle position and the upcoming travel route, and
performing the short term control process, including:
controlling operation of the vehicle such that the at least one control parameter for at least the first buffer follows the defined signal trajectory,
wherein the lone term control process further accesses information about the presence of a charging station at a predicted vehicle stop and/or a distance to the next charting station, and
wherein the short term control process at least controls at least one of electric motor torque, selection of gear speed, engine torque and air condition,
wherein a vehicle value is defined as a combination of a value of energy stored in the vehicle and a value for wear of the components comprised with the vehicle, and control of the vehicle based on the combination of the long term control process and the short term control process reduces a decrease in the vehicle value at the end of the predefined time horizon.

* * * * *